United States Patent
Yamamoto et al.

(10) Patent No.: US 8,757,886 B2
(45) Date of Patent: Jun. 24, 2014

(54) ROLLING BEARING

(71) Applicant: Minebea Co., Ltd., Nagano (JP)

(72) Inventors: Takuya Yamamoto, Kitasaku-gun (JP); Hiroshi Komiyama, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 0 days.

(21) Appl. No.: 13/722,089

(22) Filed: Dec. 20, 2012

(65) Prior Publication Data

US 2013/0163907 A1 Jun. 27, 2013

(30) Foreign Application Priority Data

Dec. 26, 2011 (JP) ................................. 2011-283794

(51) Int. Cl.
*F16C 33/76* (2006.01)
(52) U.S. Cl.
USPC .......................................... 384/484; 384/486
(58) Field of Classification Search
USPC ......................................... 384/477, 484–486
See application file for complete search history.

(56) References Cited

U.S. PATENT DOCUMENTS

| | | | |
|---|---|---|---|
| 8,267,591 B2 * | 9/2012 | Baba et al. .................... | 384/486 |
| 2002/0009246 A1 * | 1/2002 | Tsuchida et al. .............. | 384/486 |
| 2006/0291761 A1 * | 12/2006 | Gietl et al. .................... | 384/486 |
| 2012/0223266 A1 * | 9/2012 | Furukoshi ..................... | 384/484 |

FOREIGN PATENT DOCUMENTS

JP B2-3358879 12/2002

* cited by examiner

*Primary Examiner* — Thomas R Hannon
(74) *Attorney, Agent, or Firm* — Oliff PLC (57) ABSTRACT

A rolling bearing has an inner ring; an outer ring; a seal fixing groove provided at either the inner ring or the outer ring; a seal contact groove provided at either the inner ring or the outer ring on a side where the seal fixing groove has not been provided; and a sealing member with two ends. One end of the sealing member is fitted into the seal fixing groove, and the other end of the sealing member is configured not to contact the seal contact groove in a non-preloaded state but to contact the seal contact groove in an axial direction in a preloaded state. Further, a central line average roughness Ra of a contact surface of the seal contact groove to which the sealing member contacts is Ra≤0.6 μm.

10 Claims, 6 Drawing Sheets

| | Seal Noise | Surface Roughness Ra (μm) of Seal Contact Grooves | Discontinuities on Surface (Note 1) |
|---|---|---|---|
| Example 1 | Absent | 0.05 | Absent |
| Example 2 | Absent | 0.08 | Absent |
| Example 3 | Absent | 0.09 | Absent |
| Example 4 | Absent | 0.14 | Absent |
| Example 5 | Absent | 0.16 | Absent |
| Example 6 | Absent | 0.18 | Absent |
| Example 7 | Absent | 0.20 | Absent |
| Example 8 | Absent | 0.23 | Absent |
| Example 9 | Absent | 0.28 | Absent |
| Example 10 | Absent | 0.39 | Absent |
| Example 11 | Absent | 0.45 | Absent |
| Example 12 | Absent | 0.58 | Absent |
| Comparative Example 1 | Present | 0.17 | Present (Note 2) |
| Comparative Example 2 | Present | 0.25 | Present (Note 2) |
| Comparative Example 3 | Present | 0.54 | Present (Note 2) |
| Comparative Example 4 | Present | 0.67 | Absent |
| Comparative Example 5 | Present | 0.70 | Absent |

ROLLING BEARING

BACKGROUND OF THE INVENTION

1. Field of the Invention

The present invention relates to a rolling bearing, and more particularly to a rolling bearing which has a contact type sealing member including two ends. When one end thereof is fitted into either an outer ring or an inner ring of the rolling bearing, the other end thereof is configured to contact either the outer ring or the inner ring into which the one end has not been installed.

2. Description of the Related Art

In many cases, the rotating shaft of a motor is rotatably supported by a pair of preloaded rolling bearings. There is a sealed-type rolling bearing, in which a sealing member is fitted in between an inner ring and an outer ring of such a rolling bearing in order to keep grease, lubricating oil, or the like and/or in order to prevent the ingress of foreign particles into a bearing space between the inner ring and the outer ring of the rolling bearing. Further, there is a sealing member of the rolling bearing in which the sealing member contacts a seal groove provided on an inner peripheral surface of the outer ring or an outer peripheral surface of the inner ring. As an example of such a rolling bearing, for example, Japanese Patent No. 3,358,879 (hereinafter referred to as the Patent Document) discloses a rolling bearing in which a lip of a contact-type sealing member (contact seal) slidingly contacts to a seal groove formed on an outer peripheral surface of an inner ring.

However, in the above-described rolling bearing, sliding occurs between the lip of the contact seal (sealing member) and a contact surface of the seal groove to which the lip contacts. Thus, depending on operational condition of the rolling bearing, a so-called "stick-slip" may occur at sliding contact portions of the lip and the seal groove. Therefore, the sealing member itself may vibrate during the rotation of the rolling bearing, so that this vibration may cause noises, which produce unpleasant seal noises. In special, rolling bearings for a blower such as miniature ball bearings are required to have superior quietness, and these foreign noises should be suppressed.

Thus, in order to solve such a problem, for example, the Patent Document discloses: 1) contacting the lip of the contact seal to the seal groove in a radial direction; 2) providing a vertical portion which is a part of the lip extending in a radial direction and which is located closer to the outer ring than the part contacting the inner ring is; and 3) setting the surface roughness of the seal groove to 1S to 6S, i.e., more roughened than a conventional seal groove. The Patent Document thus tries to avoid the stick-slip and prevent the occurrence of contact seal vibrations and seal screeching noises.

SUMMARY OF THE INVENTION

However, in the rolling bearing disclosed in the Patent Document, the following tasks still remain for further improvement. Since the rolling bearings in a blower rotate at high speed, the rolling bearings with the surface roughness of the seal contact groove greater than the one of conventional rolling bearings, and with the lip sliding in contact with the roughened surface of the seal contact groove from radial direction, may have the lip wearing down quickly which shortens the life of the rolling bearings.

The present invention has been made in light of the above, and an object of the present invention is to provide a rolling bearing satisfying the following: a central line average roughness of a seal contact surface of an outer ring or inner ring contacting a sealing member is reduced; and a contact force (force of the sealing member pressing against the seal contact groove) between the sealing member and the seal contact groove is reduced thereby suppressing wear of the sealing member, decreasing vibration of the sealing member, and effectively preventing the occurrence of seal noises, and contributing to the life extension and superior quietness of the rolling bearing.

The embodiments of the invention described below are examples of the structure of the present invention. In order to facilitate the understanding of the various structures of the present invention, the explanations below are divided into aspects. Any of these aspects does not intend to limit the technical scope of the present invention, and it will be obvious to those skilled in the art that various changes and modification may be made therein without departing from the technical scope of the present invention.

According to the first aspect of the present invention, there is provided a rolling bearing used in a preloaded state, the rolling bearing comprising an inner ring; an outer ring; a seal fixing groove provided at either the inner ring or the outer ring; a seal contact groove provided at either the inner ring or the outer ring on a side where the seal fixing groove has not been provided; and a sealing member with two ends, wherein one end of the sealing member is fitted into the seal fixing groove; the other end of the sealing member is configured not to contact the seal contact groove in a non-preloaded state but to contact the seal contact groove in an axial direction in a preloaded state; and a central line average roughness Ra of a contact surface of the seal contact groove to which the sealing member contacts is Ra≤0.6 µm.

By using appropriate cutting tools in cutting works, the central line average roughness (surface roughness) of a contact surface of a seal contact groove of an outer ring or inner ring to which a sealing member contacts is set to Ra≤0.6 µm. In general, in rolling bearings which do not require a high level of quietness, the central line average roughness of the contact surface of the seal contact groove is Ra≤0.6 µm. In this present invention, however, the central line average roughness of the contact surface of the seal contact groove is set to be less than a prescribed value (Ra≤0.6 µm). Further, the sealing member is adapted not to contact the seal contact groove while the rolling bearing has not been preloaded, and to contact the seal contact groove from the axial direction when the rolling bearing is preloaded. It is thus possible to minimize the force which presses the sealing member to the seal contact groove and reduce the frictional forces. As a result, since the seal structure of the present invention has been configured as discussed hereinabove, and since the central line average roughness is set to the above prescribed value (Ra≤0.6 µm), a synergistic effect is achieved, well contributing to reduction of vibrations in the sealing member and to prevention of the seal noises. In addition, wear of the sealing member has been notably reduced, thereby consequentially extending the life of the rolling bearing.

In the rolling bearing of the first aspect, the sealing member is an approximately annular member in which a metal core is covered by an elastic member. The sealing member comprises: a peripheral wall part, which is an elastic body that protrudes from a peripheral portion of the metal core on the seal contact groove side toward an axially inside direction; and a lip part including a first lip which protrudes toward an axially inside direction allowing the first lip to contact the seal contact groove in an axial direction and a second lip which protrudes toward an axially outside direction not allowing the second lip to contact the seal contact groove. Further, the peripheral wall part and the lip part are connected to each other via a neck part whose thickness is smaller than that of the peripheral wall part and the lip part.

In this structure, the neck part whose thickness is smaller than that of the peripheral wall part and the lip part is provided for connecting the peripheral wall part and the lip part. Further, the shape of the neck part has been considered for achieving successful reduction of the contact force between the sealing member and the groove inner surface of the seal contact groove. Here, if the lip part which contacts the groove inner surface of the seal contact groove were deformed beyond a certain allowable limit, the contact portion of the lip part is forced to be fully pressed against the groove inner surface. The rotational torque of the rolling bearing thus increases. Considering the above, the lip part of the present invention is configured to have a first lip which protrudes axially inside and a second lip which protrudes axially outside. Accordingly, the volume of the elastic member adjacent to the contact part successfully increases, and consequentially the first lip is prevented from an excessive deformation even if the first lip is strongly pressed in an axial direction. By shaping the lip part of the sealing member to have suitable levels of rigidity, vibrations of the sealing member can be reduced, and seal noises can be prevented. Further, wear of the sealing member can be well suppressed thereby contributing to the life extension of the rolling bearing.

In the rolling bearing of the first aspect, the rolling bearing is provided for supporting a shaft member of a motor. The sealing member is placed at least on an end surface side of the rolling bearing which faces outside of the motor.

In this structure, the preloaded rolling bearing is installed into a motor to support the shaft member of the motor. Here, in a condition where the rolling bearing has not been preloaded, the sealing member is configured not to contact the groove inside surface of the seal contact groove. On the other hand, in a condition where the rolling bearing has been preloaded, the sealing member is configured to contact the seal contact groove in an axial direction. Such a sealing member will be mounted at least on a surface of the rolling bearing that faces outside of the motor. It is thus possible to prevent foreign particles from entering into the rolling bearing and to prevent lubricant in the rolling bearing from leaking to outside. Further, it is possible to reduce vibration of the sealing member which contacts the groove inside surface of the seal contact groove, contributing to prevention of seal noises.

In the rolling bearing of the first aspect, the contact surface is at least covered with a solid lubricating coating.

With this structure it is possible to reduce wear so as to prevent vibrations of the sealing member even being difficult to finish the contact surface of the seal contact groove by grinding, because the friction coefficient can be reduced as well as the surface roughness can be decreased by covering the contact surface of the seal contact groove with a solid lubricating coating.

As discussed hereinabove, by reducing the central line average roughness (surface roughness) of the seal contact surface of the outer ring or inner ring which contacts the sealing member, and by reducing contact forces (force of the sealing member pressing against the seal contact groove) between the sealing member and the seal contact groove, wear of the sealing member can be reduced, vibration of the sealing member can be decreased, and the occurrence of seal screeching noises can be effectively prevented. In consequence, the life of the rolling bearing is extended, and quietness of the rolling bearing is improved.

BRIEF DESCRIPTION OF THE DRAWINGS

FIGS. 3A-3D illustrate a manufacturing process of an inner ring of the rolling bearing where

DETAILED DESCRIPTION OF THE PREFERRED EMBODIMENTS

The structure of a rolling bearing according to one embodiment of the present invention will be explained in detail below based on FIGS. 1 and 2.

Figure 1:
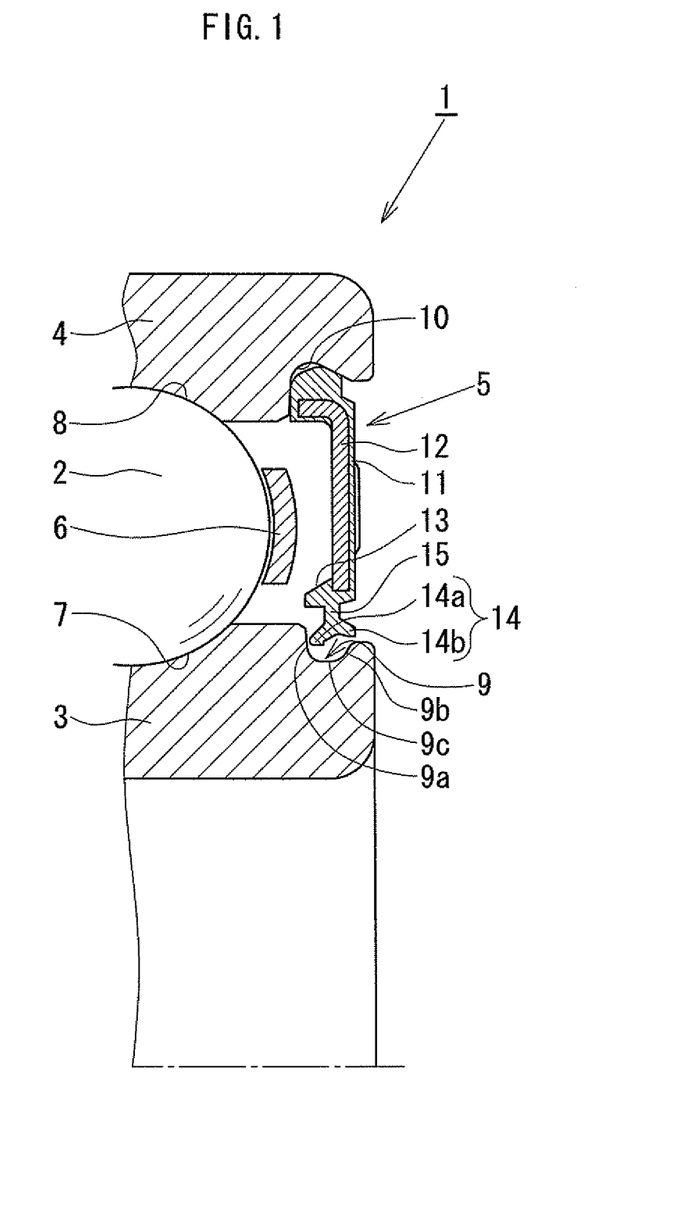
FIG. 1 is a cross-section view of one end of a rolling bearing according to one embodiment of the present invention.
Figure 2:
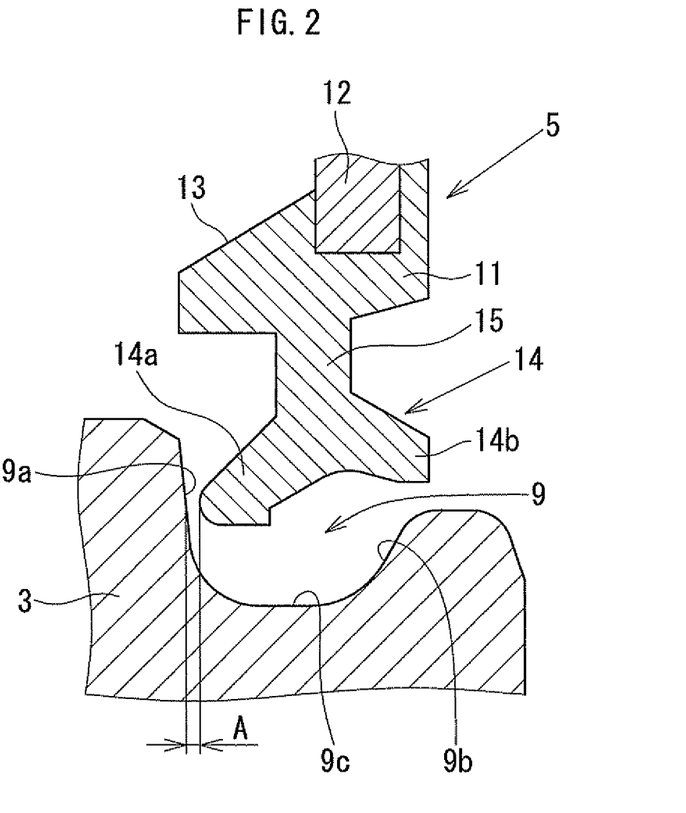
FIG. 2 is a partially enlarged view of the lip part and the seal contact groove of the rolling bearing shown in FIG. 1.

FIG. 1 is a cross-section view of one end of a rolling bearing according to one embodiment of the present invention, and FIG. 2 is a partially enlarged view of a lip part and a seal contact groove of the rolling bearing shown in FIG. 1. As shown in FIG. 1, a rolling bearing 1 of the present embodiment supports a shaft member of a motor, and the rolling bearing 1 includes an inner ring 3, an outer ring 4, a ball (steel ball) 2 which is a rolling element interposed between the inner ring 3 and the outer ring 4, a sealing member 5, and a retainer 6. Hereinbelow, the constituent members of the rolling bearing 1 is explained. Only one end side of the rolling bearing 1 is illustrated, but the other end side may be structured as the same.

On the inner ring 3, an inner ring raceway 7 is formed at the center of the outer peripheral surface, and a seal contact groove 9 is formed via a step on the inner ring raceway 7. The seal contact groove 9 includes: a groove inside surface 9a and a groove outside surface 9b which are approximately at right angles relative to the axial direction; and a groove bottom surface 9c which is approximately parallel to the axial direction. Although details are explained hereinbelow, the groove inside surface 9a is a surface which makes contact with the sealing member 5. On the outer ring 4, an outer ring raceway 8 is formed at the center of the inner peripheral surface so as to face the inner ring raceway 7, and a seal fixing groove 10 into which a fixing part formed on an outer radial side of the sealing member 5 is fitted is formed on the outer ring raceway 8. Further, a plurality of balls 2 are placed between the inner ring raceway 7 of the inner ring 3 and the outer ring raceway 8 of the outer ring 4, the balls 2 being each retained by the retainer 6 at certain intervals therebetween.

The sealing member 5 is a composite annular member which includes an elastic member 11, and a metal core 12 insert-molded into the elastic member 11. A fixing part which fits into the seal fixing groove 10 of the outer ring 4 is formed on the outer radial side of the sealing member 5. As shown in FIG. 2, a peripheral wall part 13, which is an elastic body that protrudes from an inner peripheral portion of the sealing member 5 on the inner radial side toward an axially inside direction, and a lip part 14 including a first lip 14a which protrudes toward an axially inside direction and a second lip 14b which protrudes toward an axially outside direction are formed on the inner radial side of the sealing member 5.

The first lip 14a is configured as that it does not contact the seal contact groove 9 when the rolling bearing 1 is not preloaded but contacts the groove inside surface 9a of the seal contact groove 9 in the axial direction when the rolling bearing 1 has been preloaded. When the rolling bearing has not been preloaded, a gap A (refer to FIG. 2) formed between the groove inside surface 9a of the seal contact groove 9 and the first lip 14a is set so that it is no more than half of an axial internal clearance of the rolling bearing 1. The axial internal clearance is an amount of travel when the inner ring 3 is fixed, a measurement load is applied to the outer ring 4, and the rings are moved alternately in the axial direction. Thereby, the contact force (pressing force) between the first lip 14a and the seal contact groove 9 can be suppressed to minimum.

The second lip 14b never contacts the seal contact groove 9. Its function is to increase the volume of the elastic member 11 near the contact part. Accordingly, the first lip 14a will not be deformed more than necessary even if the first lip 14a has been forcibly pressed in the axial direction. More specifically, in FIG. 2, the first lip 14a protrudes in a diagonally downward direction toward the inner ring 3, and thus it would be deformed in a counter-clockwise direction when pressed from the right side in the axial direction to the groove inside surface 9a. However, the first lip 14a cannot be easily deformed in the counter-clockwise direction because it protrudes diagonally downward toward the outside of the rolling bearing 1 and toward the inner ring 3. Therefore, excessive deformation of the first lip 14a in the counter-clockwise direction can be suppressed. Meanwhile, if the second lip part 14b is configured to be protruded diagonally upward toward the outer ring 4, it would be easily deformed in the counter-clockwise direction as the same with the first lip 14a. As a result, this weakens the second lip part 14b for suppressing the excessive deformation of the first lip 14a. In consideration of the above, the first lip 14a and the second lip 14b should preferably protrude toward the same raceway ring (toward the inner ring 3 in FIG. 2). Moreover, the peripheral wall part 13 and the lip part 14 are connected to each other via a neck part 15 which is thinner than the thickness of both the peripheral wall part 13 and the lip part 14. Here, the neck part 15 functions to reduce the contact forces between the first lip 14a and the seal contact groove 9.

By mounting the sealing member 5 on the rolling bearing 1, a sealed bearing space is defined by the space between the sealing member 5, the inner ring 3, the outer ring 4 and the plurality of balls 2. Grease (lubricant) for lubrication is filled within the bearing space. With this structure, the sealing member 5 is allowed to seal the bearing space between the inner ring 3 and the outer ring 4 so as to prohibit foreign particles coming from the outside of the rolling bearing 1 and to prevent grease or oil leaking from the interior of the rolling bearing 1.

Next, manufacturing processes of the inner ring 3 in this rolling bearing 1 are hereinbelow explained.

Figures 3A, 3B:
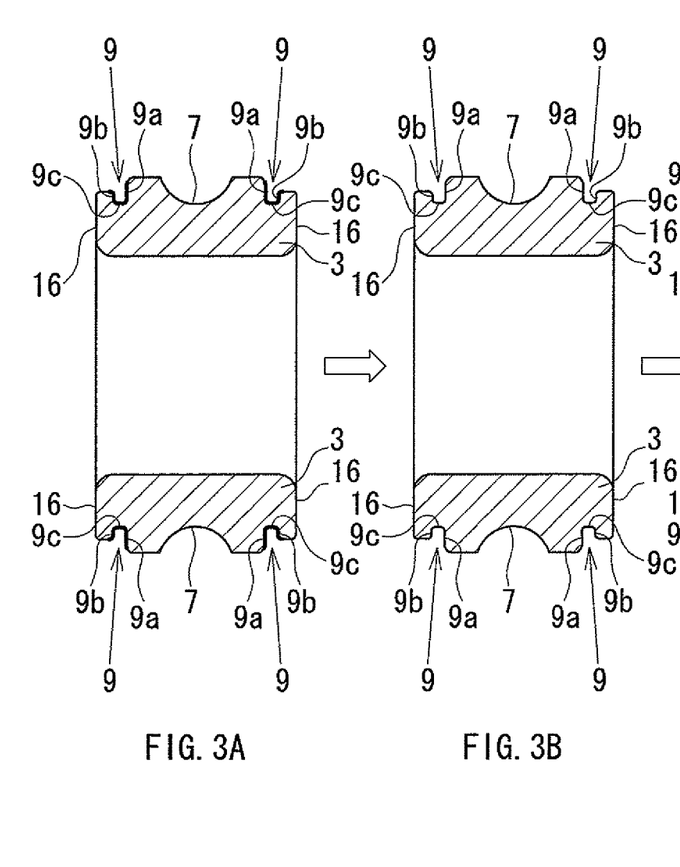
FIG. 3A is a cutting step in which an raceway ring member for an inner ring is cut to form the outer shape of the inner ring.
FIG. 3B is a heat treatment step the blank for the inner ring obtained in 3A is subjected to a heat treatment.
Figure 3C:
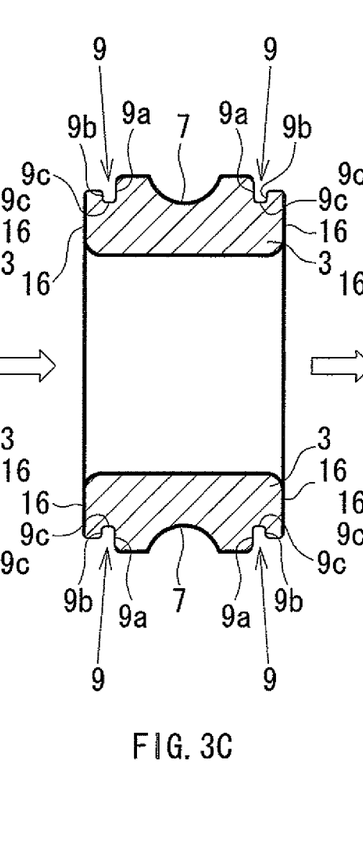
FIG. 3C is a grinding step in which an inner ring raceway, both end surfaces, and the inner diameter of the blank for the inner ring obtained in 3B are ground.
Figure 3D:
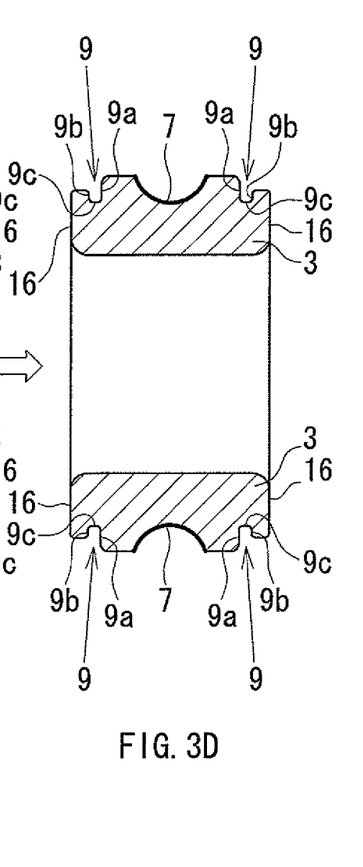
FIG. 3D is a superfinishing step in which the inner ring raceway of the blank for the inner ring obtained in FIG. 3C is finished.

FIG. 3 is a diagram illustrating the manufacturing processes of the inner ring of the rolling bearing. As shown in FIG. 3, the manufacturing processes of the inner ring 3 of the rolling bearing 1 include the following steps: (a) a cutting step in which an raceway ring member for the inner ring 3 is cut to form the outer shape of the inner ring 3; (b) a heat treatment step in which the blank for the inner ring 3 obtained in the cutting step (a) is subjected to a heat treatment to improve the mechanical properties; a grinding step (c) in which the inner ring raceway 7, both end surfaces 16 and 16, and the inner diameter of the blank for the inner ring 3 obtained in the heat treatment step (b) are ground; and a superfinishing step (d) in which the inner ring raceway 7 of the blank for the inner ring 3 obtained in the grinding step (c) is finished. Each step is explained in this order below. In the figures relative to cutting step (a), grinding step (c), and superfinishing step (d), bold lines indicate the locations where respective process is to be conducted.

Hereinbelow, processed surface conditions are explained by using a central line average roughness Ra. In this specification, when only the term "surface roughness" is used, it should be understood that "surface roughness" means the central line average roughness Ra.

First, in the cutting step (a), a race material for producing a race for the inner ring 3 is prepared, and then the race material is cut to form the outer shape of the inner ring 3. In this cutting step (a), the cutting is carried out so that the surface roughness of the seal contact grooves 9 and 9 of the inner ring 3 formed by cutting is not more than 0.6 μm (Ra≤0.6 μm). The surface roughness of Ra≤0.6 μm can be obtained in the cutting step (a) by appropriately maintaining the cutting tools in good condition while carrying out the cutting process. The surface roughness of the groove inside surfaces 9a and 9a, the groove outside surfaces 9b and 9b, and the groove bottom surfaces 9c and 9c of the seal contact grooves 9 and 9 is set to be within the range of 0.05 to 0.6 μm (0.05≤Ra≤0.6 μm). Here, as the race material for the inner ring 3, SUJ2 high carbon chromium bearing steel has been used.

Next, in the heat treatment step (b), the blank for the inner ring 3 obtained in the cutting step (a) is subjected to a quenching and tempering heat treatment to obtain necessary mechanical properties of the blank, or in other words to obtain a prescribed hardness of the material. In the heat treatment step (b), by subjecting the blank for the inner ring 3 to the quenching and tempering heat treatment, the hardness of the blank for the inner ring 3 can be increased, and as a result the Rockwell C hardness of the blank for the inner ring 3 reaches HRC57 or greater.

In the grinding step (c), the inner ring raceway 7 and both end surfaces 16 and 16 of the blank for the inner ring 3 that have been subjected to the quenching and tempering treatment in the heat treatment step (b) are ground to a surface roughness which is less than the surface roughness of the blank for the inner ring 3 obtained in the cutting step (a). As a result of grind of the inner ring raceway 7, both end surfaces 16 and 16, and the inner diameter of the blank for the inner ring 3, the surface roughness of the inner ring raceway 7, both end surfaces 16 and 16, and the inner diameter have reached a value in the range of 0.03 μm<Ra≤0.6 μm. The seal contact grooves 9 and 9 of the inner ring 3 have not been subjected to the grinding. Therefore, the surface roughness of the groove inside surfaces 9a and 9a, the groove outside surfaces 9b and 9b, and the groove bottom surfaces 9c and 9c of the seal contact grooves 9 and 9 have remained in the range of 0.05≤Ra≤0.6 μm.

Next, in the superfinishing step (d), the inner ring raceway 7 of the blank for the inner ring 3 that has been ground in the grinding step (c) is superfinished to a surface roughness which is even less than the surface roughness of the blank for the inner ring 3 obtained in the grinding step (c). As a result of superfinishing the inner ring raceway 7 of the blank for the inner ring 3, the surface roughness of the inner ring raceway 7 has reached a surface roughness not more than 0.03 μm (Ra≤0.03 μm). The seal contact grooves 9 and 9, both end surfaces 16 and 16, and the inner diameter of the inner ring 3 have not been subjected to this superfinishing. Therefore, the surface roughness of the groove inside surfaces 9a and 9a, the groove outside surfaces 9b and 9b, and the groove bottom surfaces 9c and 9c of the seal contact grooves 9 and 9 have remained within the range of 0.05≤Ra≤0.6 μm, and the surface roughness of both end surfaces 16 and 16 and the inner diameter have remained within the range of 0.03 μm<Ra≤0.6 μm.

The surface roughness of each part of the inner ring 3 according to this embodiment following the cutting step (a), the heat treatment step (b), the grinding step (c), and the superfinishing step (d) in this order was set as follows.

The surface roughness of the inner ring raceway 7 was Ra≤0.03 μm, the surface roughness of the groove inside surfaces 9a and 9a, the groove outside surfaces 9b and 9b, and the groove bottom surfaces 9c and 9c of the seal contact grooves 9 and 9 was within the range of 0.05≤Ra≤0.6 μm, and the surface roughness of both end surfaces 16 and 16 and the inner diameter was within the range of 0.03 μm<Ra≤0.6 μm.

Now, evaluations of comparative tests are explained with reference to FIG. 4. These comparative tests have been performed between Examples 1 to 12 that have been obtained through work on the inner ring 3 of the rolling bearing 1 of the present embodiment and Comparative Examples 1 to 5 in which the surface roughness of the seal grooves 9 and 9 of the inner ring 3 is more than 0.6 μm (Ra>0.6 μm).

Figure 4:
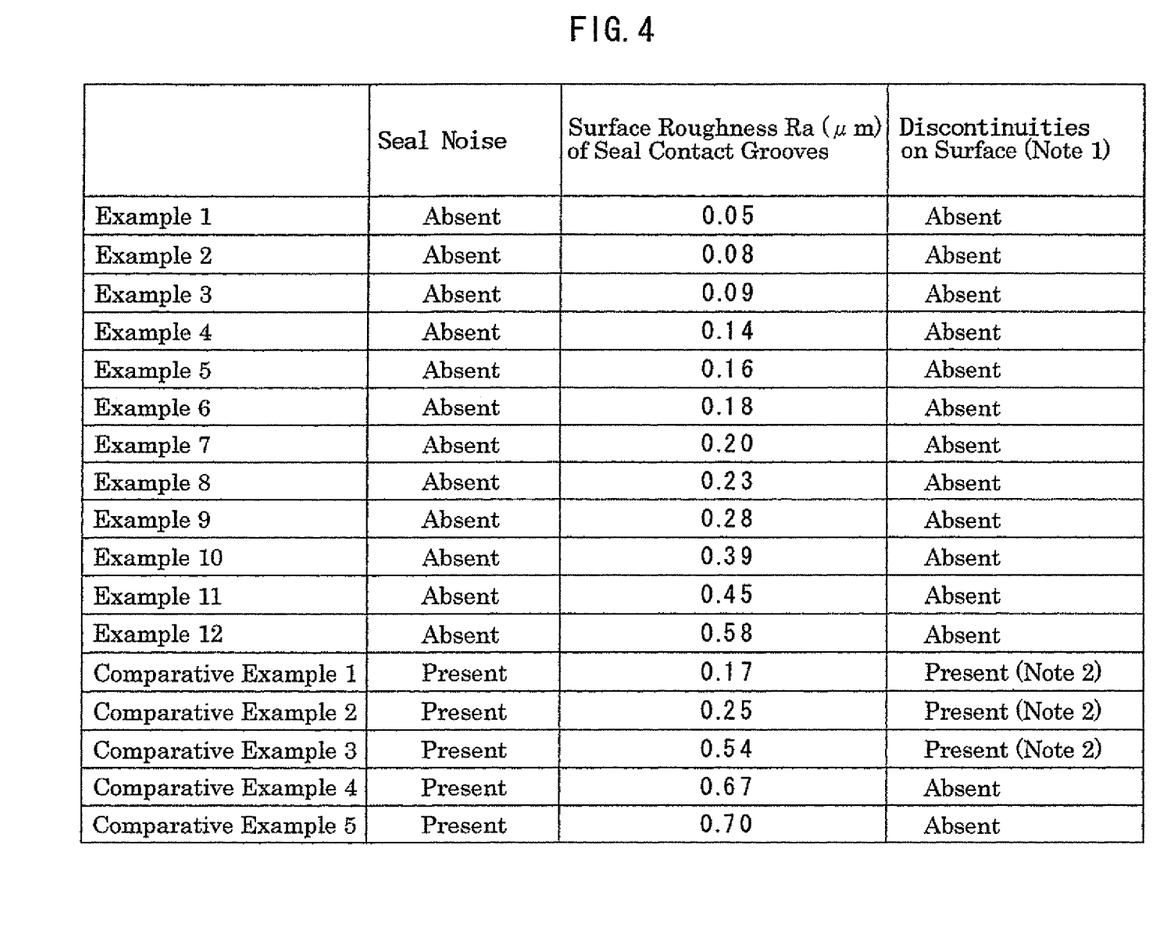
FIG. 4 is a table showing evaluations of comparative tests of Examples having the inner ring of the rolling bearing manufactured according to the present invention and Comparative Examples.

FIG. 4 shows evaluation results as to the presence or absence of seal screeching noises and also the presence or absence of non-continuous parts on the surface of the inner ring 3 when comparing between Examples 1 to 12 and Comparative Examples 1 to 5. As shown in FIG. 4, each surface roughness Ra of the seal contact groove 9 of Examples 1 to 12 subject to evaluation is as follows: Example 1 is Ra=0.05 μm; Example 2 is Ra=0.08 μm; Example 3 is Ra=0.09 μm; Example 4 is Ra=0.14 μm; Example 5 is Ra=0.16 μm; Example 6 is Ra=0.18 μm; Example 7 is Ra=0.20 μm; Example 8 is Ra=0.23 μm; Example 9 is Ra=0.28 μm; Example 10 is Ra=0.39 μm; Example 11 is Ra=0.45 μm; and Example 12 is Ra=0.58 μm.

Each surface roughness Ra of the seal contact groove 9 of Comparative Examples 1 to 5 subject to evaluation is as follows: Comparative Example 1 is Ra=0.17 μm; Comparative Example 2 is Ra=0.25 μm; Comparative Example 3 is Ra=0.54 μm; Comparative Example 4 is Ra=0.67 μm; and Comparative Example 5 is Ra=0.70 μm. In Examples 1 to 12 and Comparative Examples 1 to 5, the presence or absence of seal noises and the small discontinuities on the surface have been evaluated.

In FIG. 4, "(Note 1)" indicates verification results of the existence of discontinuities (for example, ripped-off surfaces) when the surface of the seal contact groove 9 of the rolling bearing 1 is observed at 20 times magnification with a stereomicroscope. In addition, "(Note 2)" indicates the corresponding values of surface roughness are reference values because discontinuities have existed on the surface of the seal contact groove 9 of the rolling bearing 1. In this case, the surface roughness has been measured choosing a part of the surface with no discontinuity since the actual surface roughness of the surface including non-continuous parts is difficult to be measured.

Approximate dimensions of the rolling bearing (JIS608ZZ) used in the comparative tests are an outer diameter of 22 mm, an inner diameter of 8 mm, and an axial internal clearance of 0.10 mm. The gap A between the groove inside surface 9a of the seal contact groove 9 and the first lip 14a when the rolling bearing has not been preloaded is 0.04 mm. Force of the first lip 14a which presses against the groove inside surface 9a of the seal contact groove 9 when the rolling bearing has been preloaded is not more than 0.4 N.

In the comparative tests, two identical rolling bearings have been preloaded and assembled on a shaft of a DC brushless motor for a ventilation fan, and the inner rings of the rolling bearings have been rotated at a number of rotations n=1800 rpm. It has been evaluated whether seal noises could be audibly confirmed at a position approximately 30 cm away from the DC brushless motor. Further, during the tests, the noise level in the test room has been maintained at a level which usually a person does not feel unpleasant (approximately 45 dB or less).

Figure 5:
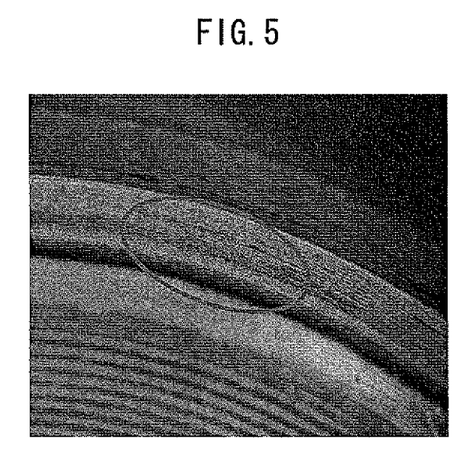
FIG. 5 is a view illustrating the appearance of a wall surface of the seal contact groove of the rolling bearing.
Figure 6:
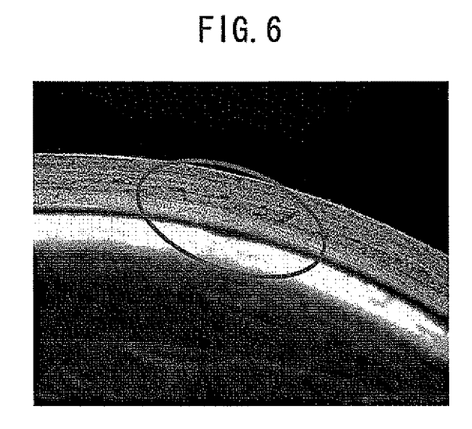
FIG. 6 is a view illustrating a state in which the wall surface of the seal contact groove of the rolling bearing shown in FIG. 5 has been ripped off.
Figure 7A:
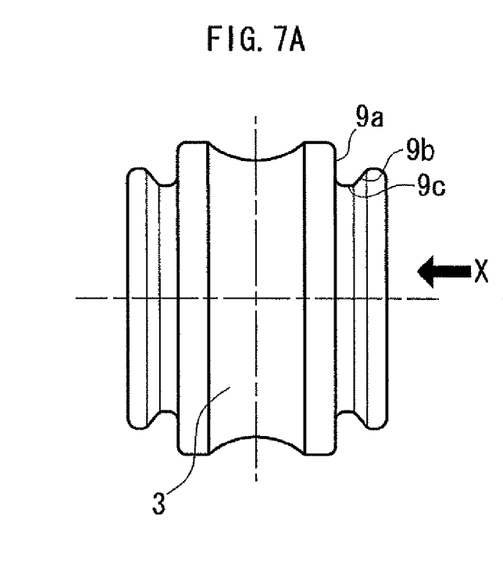
FIG. 7A is a view illustrating the complete inner ring of the rolling bearing.
Figure 7B:
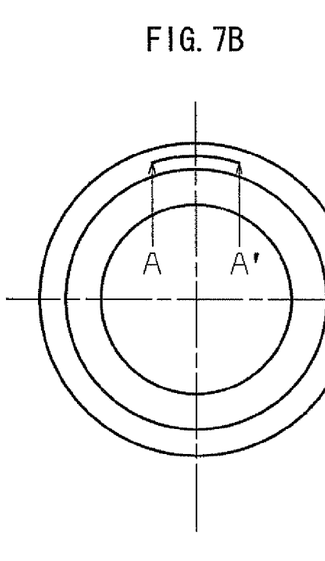
FIG. 7B is a view which observes the inner ring of FIG. 7A in an X-arrow direction.
Figure 7C:
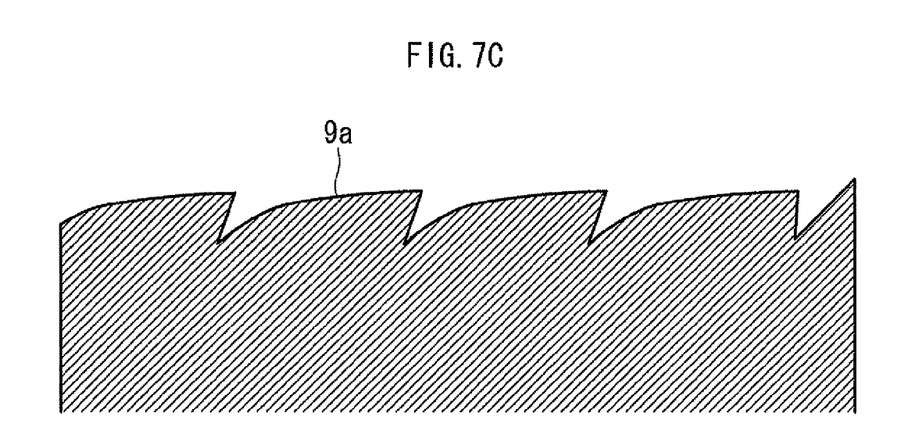
FIG. 7C is a view illustrating a partially expanded cross-sectional view taken along the line A-A' in FIG. 7B.

The results based on the comparative tests between Examples 1 to 12 and Comparative Examples 1 to 5 are as follows. In Examples 1 to 12 where the surface roughness Ra on which the sealing member 5 contacts the groove inside surface 9a of the seal contact groove 9 is within the range of 0.05≤Ra≤0.6 μm, no seal noise is produced, and there are no ripped-off surfaces or the like (see the circle in FIG. 5). However, in Comparative Examples 1 to 3, since the discontinuities such as ripped-off surfaces (see the circle in FIG. 6) exist in the rolling bearing, the substantial surface roughness cannot be said low enough because the lip part 11 of the sealing member 5 slidingly contacts the discontinuities such as ripped-off surfaces of the groove inside surface 9a so as to cause vibration during the rotation of the rolling bearing 1. Here, the ripped-off surfaces may be more visually understandable in FIG. 7C which illustrates the partially expanded cross-sectional view of the groove inside surface 9a taken along the line A-A' in FIG. 7B. Seal noises will be thus produced even if the reference value of surface roughness is low. Further, in Comparative Examples 4 and 5, seal noises are produced as the same with Comparative Examples 1 to 3 since the surface roughness of the groove inside surface 9a at which the sealing member 5 contacts the seal contact groove 9 is Ra>0.6 μm even if the discontinuities such as ripped-off surfaces do not exist.

As a result, in the rolling bearing 1 in which the surface roughness of the groove inside surface 9a of the seal contact groove 9 of the inner ring 3 which makes contact with the sealing member 5 is in the range of Ra≤0.6 μm, and preferably 0.05≤Ra≤0.6 μm and discontinuities do not exist, the wear and vibration of the sealing member 5 during operation of the rolling bearing 1 can be reduced, and the seal noises can be prevented.

The above embodiment of the present invention refers to a ball bearing in which the rolling element is a ball. However, the present invention is not limited thereto, and it can be applied to other type of rolling bearing such as a roller bearing.

Further, the contact surface of the seal contact grooves 9 and 9 having the shape described in the above embodiment is difficult to be finished by grinding. However, the coefficient of friction and the surface roughness can be reduced by covering the seal contact grooves 9 and 9 with a solid lubricating coating. For example, a diamond like carbon (DLC) coating may be used as a solid lubricating coating. The DLC coating exhibits high hardness and remarkably low coefficient of friction under dry condition, and thus the wear is low and the vibration of the end of the lip part 14 of the sealing member 5 can be favorably suppressed.

In the above embodiment of the present invention, the surface roughness Ra of the seal contact groove 9 of the inner ring 3 of the rolling bearing 1 is set to a prescribed value in order to reduce the wear and vibration of the sealing member 5 during operation of the rolling bearing 1 and to prevent seal noises. However, needless to say, the present invention is also applicable in the same manner as a rolling bearing having sealing members slidably contacting outer rings.

What is claimed is:

1. A rolling bearing used in a preloaded state comprising:
   an inner ring;
   an outer ring;
   a seal fixing groove provided at either the inner ring or the outer ring;
   a seal contact groove provided at either the inner ring or the outer ring on a side where the seal fixing groove has not been provided; and
   a sealing member with two ends,
   wherein one end of the sealing member is fitted into the seal fixing groove and the other end of the sealing member is configured not to contact the seal contact groove in a non-preloaded state but to contact the seal contact groove in an axial direction in a preloaded state; and a central line average roughness Ra of a contact surface of the seal contact groove to which the sealing member contacts is Ra≤0.6 μm.

2. The rolling bearing according to claim 1, wherein the sealing member is an approximately annular member in which a metal core is covered by an elastic member,
   the sealing member comprises: a peripheral wall part, which is an elastic body that protrudes from a peripheral portion of the metal core at the seal contact groove side toward an axially inside direction; and a lip part including a first lip which protrudes toward an axially inside direction allowing the first lip to contact the seal contact groove in an axial direction and a second lip which protrudes toward an axially outside direction not allowing the second lip to contact the seal contact groove, and
   the peripheral wall part and the lip part are connected to each other via a neck part whose thickness is smaller than that of the peripheral wall part and the lip part.

3. The rolling bearing according to claim 1, wherein the rolling bearing is provided for supporting a shaft member of a motor, and the sealing member is placed at least on an end surface side of the rolling bearing which faces an outside of the motor.

4. The rolling bearing according to claim 1, wherein at least the contact surface is covered with a solid lubricating coating.

5. The rolling bearing according to claim 4, wherein the solid lubricating coating is a diamond like carbon coating.

6. A rolling bearing used in a preloaded state comprising:
   an inner ring;
   an outer ring;
   a seal contact groove provided at either the inner ring or the outer ring; and
   a sealing member with two ends,
   wherein one of the ends of the sealing member contacts the seal contact groove in an axial direction only when a preload is applied; and a central line average roughness Ra of a contact surface of the seal contact groove to which the sealing member contacts is Ra≤0.6 μm.

7. The rolling bearing according to claim 6, wherein the sealing member is an approximately annular member in which a metal core is covered by an elastic member,
   the sealing member comprises:
   a peripheral wall part, which is an elastic body that protrudes from a peripheral portion of the metal core at the seal contact groove side toward an axially inside direction; and
   a lip part including a first lip protruding toward an axially inside direction which contacts the seal contact groove in an axial direction when the preload is applied, and a second lip protruding toward an axially outside direction which does not contact the seal contact groove even when the preload is applied, and
   the peripheral wall part and the lip part are connected to each other via a neck part whose thickness is smaller than that of the peripheral wall part and the lip part.

8. The rolling bearing according to claim 6 for supporting a shaft member of a motor wherein the sealing member is placed at least on a side of the rolling bearing which faces an outside of the motor.

9. The rolling bearing according to claim 6, wherein at least the contact surface is covered with a solid lubricating coating.

10. The rolling bearing according to claim 9, wherein the solid lubricating coating is a diamond like carbon coating.

* * * * *